(12) United States Patent
Shi et al.

(10) Patent No.: US 11,177,506 B2
(45) Date of Patent: Nov. 16, 2021

(54) NON-AQUEOUS ELECTROLYTE FOR LITHIUM ION BATTERY AND LITHIUM ION BATTERY

(71) Applicant: SHENZHEN CAPCHEM TECHNOLOGY CO., LTD., Guangdong (CN)

(72) Inventors: Qiao Shi, Guangdong (CN); Muchong Lin, Guangdong (CN); Shiguang Hu, Guangdong (CN); Guanjie Ai, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 233 days.

(21) Appl. No.: 16/490,895

(22) PCT Filed: Jun. 23, 2017

(86) PCT No.: PCT/CN2017/089724
§ 371 (c)(1),
(2) Date: Sep. 4, 2019

(87) PCT Pub. No.: WO2018/196145
PCT Pub. Date: Nov. 1, 2018

(65) Prior Publication Data
US 2019/0393551 A1 Dec. 26, 2019

(30) Foreign Application Priority Data
Apr. 28, 2017 (CN) .......................... 201710297522.6

(51) Int. Cl.
*H01M 10/0567* (2010.01)
*H01M 4/525* (2010.01)
*H01M 10/0525* (2010.01)
*H01M 4/02* (2006.01)

(52) U.S. Cl.
CPC ....... *H01M 10/0567* (2013.01); *H01M 4/525* (2013.01); *H01M 10/0525* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 3,663,569 A | 5/1972 | Lew | |
| 6,174,629 B1 | 1/2001 | Gan et al. | |
| 2008/0248397 A1* | 10/2008 | Jung | H01M 10/0525 429/314 |
| 2013/0337341 A1* | 12/2013 | Tikhonov | H01M 10/0568 429/326 |

FOREIGN PATENT DOCUMENTS

| | | |
|---|---|---|
| CN | 1495959 A | 5/2004 |
| CN | 102195076 A | 9/2011 |
| CN | 103151559 A | 6/2013 |
| CN | 103354962 A | 10/2013 |
| CN | 103441304 A | 12/2013 |
| CN | 103460496 A | 12/2013 |
| CN | 103594729 A | 2/2014 |
| CN | 104300174 A | 1/2015 |
| CN | 105051965 A | 11/2015 |
| CN | 105161763 A | 12/2015 |
| CN | 105580189 A | 5/2016 |
| CN | 105633461 A | 6/2016 |
| CN | 105830270 A | 8/2016 |
| CN | 106058317 A | 10/2016 |
| CN | 106252639 A | 12/2016 |
| CN | 106328996 A | 1/2017 |
| CN | 106410272 A | 2/2017 |
| GB | 1147540 A | 4/1969 |
| JP | 2000260467 A | 9/2000 |
| JP | 2006219406 A | 8/2006 |
| JP | 2014182951 A | 9/2014 |
| JP | 2014525667 A | 9/2014 |
| JP | 2015092476 A | 5/2015 |
| WO | 2016025589 A1 | 2/2016 |
| WO | 2016151983 A1 | 9/2016 |

OTHER PUBLICATIONS

Machine Translation of JP 2006-219406 (cited on IDS) (Year: 2006).*
International Search Report of PCT Patent Application No. PCT/CN2017/089724 dated Jan. 23, 2018.
Libo Hu et al., Fluorinated electrolytes for 5-V Li-ion chemistry: Dramatic enhancement of LiNi0.5Mn1.5O4/graphite cell performance by a lithium reservoir, Electrochemistry Communications, Apr. 2014, vol. 44, pp. 34-37.

* cited by examiner

*Primary Examiner* — Eugenia Wang

(57) ABSTRACT

To address the existing problem of insufficient cycle performance and high-temperature storage performance of lithium ion battery electrolyte at high pressure, the disclosure provides a non-aqueous electrolyte for lithium ion battery. The non-aqueous electrolyte for lithium ion battery comprises a cyano-containing compound A and a compound B represented by formula I, Formula I

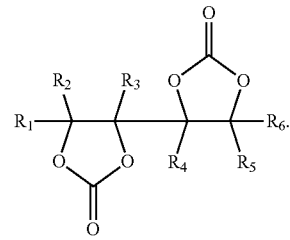

The non-aqueous electrolyte for lithium ion battery provided by the disclosure contains both the cyano-containing compound A and the compound B, so that the lithium ion battery containing the non-aqueous electrolyte can have better cycle performance and high-temperature storage performance at high pressure.

9 Claims, No Drawings

NON-AQUEOUS ELECTROLYTE FOR LITHIUM ION BATTERY AND LITHIUM ION BATTERY

TECHNICAL FIELD

The invention relates to the field of lithium ion batteries, more particularly, to a non-aqueous electrolyte for lithium ion battery and lithium ion battery.

BACKGROUND

Lithium-ion batteries have been widely used in the fields of digital products such as mobile phones and notebook computers because of their advantages of light weight, small volume, high working voltage, high energy density, high output power, high charging efficiency, no memory effect and long cycle life, etc. They are also considered as one of the best choices for electric vehicles and large energy storage devices. With the rapid development of electronic and digital products such as smart phones and tablet computers, the requirements for energy density of batteries are increasing, making the existing commercial lithium ion batteries difficult to meet the use requirements. Using high voltage anode materials is the most effective way to improve the energy density of lithium ion batteries.

Increasing the operating voltage of lithium ion batteries often leads to performance degradation. Because under high voltage, on the one hand, the crystal structure on the positive electrode of battery has certain instability, and in the charge-discharge process, the structure will collapse, resulting in deterioration of performance; On the other hand, under high voltage, the surface of the positive electrode is in a high oxidation state with high activity, which can easily catalyze the oxidative decomposition of the electrolyte, and the decomposition products of the electrolyte are likely to deposit on the surface of the positive electrode, blocking the diffusion channel of lithium ions, thus deteriorating the performance of the battery.

Electrolyte is the key factor that affects the comprehensive performance of battery, especially, additives in electrolyte are particularly important for the performances of battery. Therefore, to give full play to the performance of lithium ion batteries, such as lithium cobalt oxide batteries, the selection of electrolyte is the key. At present, practical lithium ion batteries can ensure excellent cycle performance by adding traditional film-forming additives such as vinylene carbonate (VC) or fluoroethylene carbonate (FEC) into non-aqueous electrolyte. However, VC has poor high voltage stability and can easily decompose and generate gas with FEC under high temperature. Therefore, under high voltage and high temperature, these additives are difficult to meet the performance requirements of lithium ion battery cycle.

A patent discloses an electrolyte for lithium ion batteries, which contains a cyano-containing compound additive, and the cyano-containing additive can improve the storage performance of lithium ion batteries under high voltage of 4.2V~4.5V. Studies have found that the cyano-containing additive has an obvious complexing effect on Co ions in high oxidation state, thus inhibiting the continuous decomposition of electrolyte under high voltage and the dissolution of positive electrode Co ions. However, the cyano-containing additive could cause certain deterioration to graphite negative electrode, and the use of the cyano-containing additive alone has the problem of insufficient cycle performance. Moreover, the combination of the traditional negative film-forming additive vinylene carbonate or fluoroethylene carbonate with the cyano-containing additive does not significantly improve the performances and still has the problem of insufficient cycle performance and high-temperature storage performance.

SUMMARY

The present application provides a non-aqueous electrolyte for lithium ion battery with both better cycle performance and high-temperature storage performance, and aims to solve the problem of insufficient cycle performance and high-temperature storage performance of the existing lithium ion battery electrolyte at high pressure.

Another object of the disclosure is to provide a lithium ion battery.

The non-aqueous electrolyte for lithium ion battery provided by the present application, comprises a cyano-containing compound A and a compound B represented by formula I,

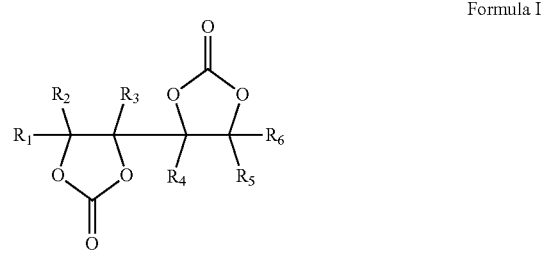

Formula I

In formula I, $R_1$, $R_2$, $R_3$, $R_4$, $R_5$ and $R_6$ are each independently selected from one of hydrogen atom, halogen atom and C1-C5 group.

Preferably, the cyano-containing compound A comprises at least one of the compounds represented by the following formulae II, III, IV and V,

Formula II

Formula III

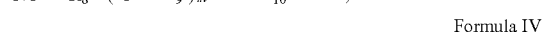

Formula IV

Formula V

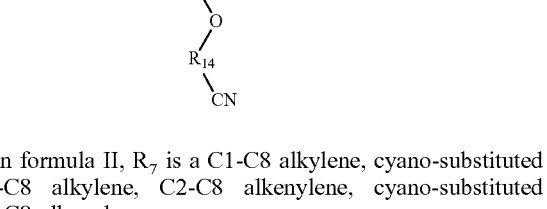

In formula II, $R_7$ is a C1-C8 alkylene, cyano-substituted C1-C8 alkylene, C2-C8 alkenylene, cyano-substituted C2-C8 alkenylene;

In formula III, $R_8$, $R_9$ and $R_{10}$ are each independently selected from a C1-C5 alkylene and C2-C5 alkenylene, and m is an integer of 1-5;

In formula IV, $R_{11}$ is a C2-C5 unsaturated hydrocarbon group, and $R_{12}$ is a C1-C5 alkylene;

In formula V, $R_{13}$, $R_{14}$ and $R_{15}$ are each independently selected from a C1-C5 alkylene and C2-C5 alkenylene.

Preferably, in formula I, the C1-C5 group is selected from a C1-C5 hydrocarbon group, halogenated hydrocarbon group, oxygen-containing hydrocarbon group, silicon-containing hydrocarbon group, and cyano-substituted hydrocarbon group. Preferably, $R_1$, $R_2$, $R_3$, $R_4$, $R_5$ and $R_6$ are each independently selected from a hydrogen atom, fluorine atom, C1-C5 methyl group, C1-C5 ethyl group, C1-C5 methoxyl group, C1-C5 ethyoxyl group, C1-C5 trimethylsiloxy group, C1-C5 cyano group or C1-C5 trifluoromethyl group.

Preferably, the compound B comprises one or more of compounds 1-9 represented by the following structural formulae, Compound 1
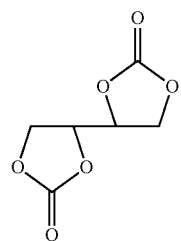

Compound 2
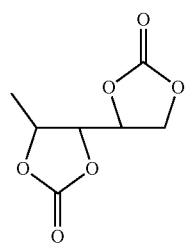

Compound 3
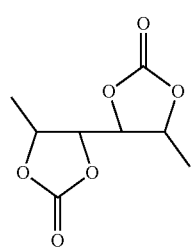

Compound 4
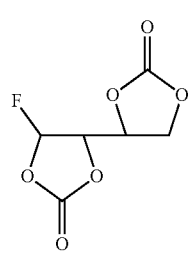

Compound 5
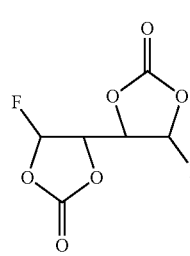

-continued

Compound 6
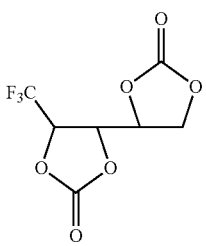

Compound 7
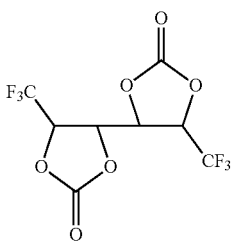

Compound 8
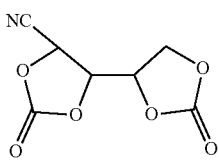

Compound 9
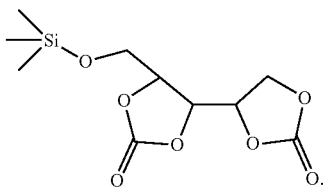

Preferably, the percentage mass content of the compound B is 0.1-5% based on the total mass of the non-aqueous electrolyte for lithium ion battery being 100%.

Preferably, the cyano-containing compound A comprises one or more of compounds 10-19 represented by the following structural formulae, Compound 10
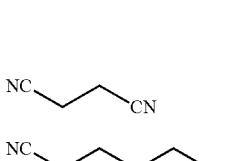

Compound 11

Compound 12
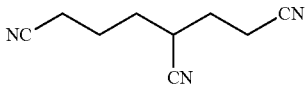

Compound 13
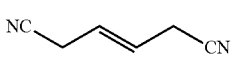

Compound 14
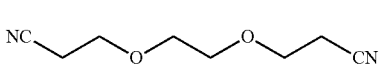

Compound 15
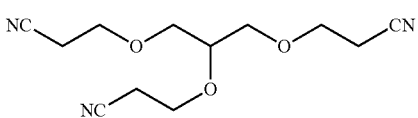

-continued

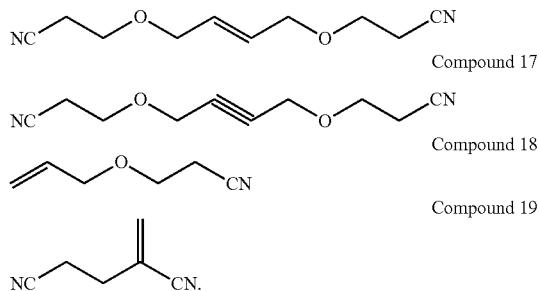

Compound 16
Compound 17
Compound 18
Compound 19

Preferably, the percentage mass content of the cyano-containing compound A is 0.1-5% based on the total mass of the non-aqueous electrolyte for lithium ion battery being 100%.

Preferably, the lithium ion non-aqueous electrolyte further comprises at least one of unsaturated cyclic carbonate compounds, fluorine-substituted cyclic carbonate compounds, and sultone compounds.

More preferably, the unsaturated cyclic carbonate compound includes at least one of vinylene carbonate (VC) and vinyl ethylene carbonate (VEC). The fluorine-substituted cyclic carbonate compound includes fluoroethylene carbonate (FEC). The sultone compound is selected from at least one of 1,3-propane sultone (1,3-PS), 1,4-butane sultone (1,4-BS), and 1,3-propene sultone (PST).

Preferably, the non-aqueous electrolyte for lithium ion battery comprises a non-aqueous organic solvent, and the non-aqueous organic solvent is at least one of vinyl carbonate, propylene carbonate, butylene carbonate, dimethyl carbonate, diethyl carbonate, methyl ethyl carbonate and methyl propyl carbonate.

Preferably, the lithium salt is selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$. The lithium salt content in the non-aqueous electrolyte for lithium ion battery is 0.1-15%.

And, a lithium ion battery, comprises a positive electrode, a negative electrode, a separator interposed between the positive electrode and the negative electrode, and an electrolyte, wherein the electrolyte is the non-aqueous electrolyte for lithium ion battery.

The positive electrode comprises a positive electrode active material, and the positive electrode active material is at least one of $LiNi_xCo_yMn_zL_{(1-x-y-z)}O_2$, $LiCo_xL_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe, $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

The non-aqueous electrolyte for lithium ion battery provided by the disclosure contains both the cyano-containing compound A and the compound B, which can effectively improve the cycle performance and high-temperature storage performance of the battery at high pressure, so that the lithium ion battery containing the non-aqueous electrolyte has better cycle performance and high-temperature storage performance.

The lithium ion battery provided by the application contains the above-mentioned non-aqueous electrolyte, which enables the lithium ion battery to have both better cycle performance and high-temperature storage performance.

DETAILED DESCRIPTION OF DISCLOSED EMBODIMENTS

In order to make the technical problems to be solved, technical solutions and beneficial effects more apparent and clearer, the present application will be described in further detail below with reference to embodiments. It should be understood that the specific embodiments described herein are only for the purpose of explaining the present invention and are not intended to limit the present invention.

The non-aqueous electrolyte for lithium ion battery provided by the present application, comprises a cyano-containing compound A and a compound B represented by formula

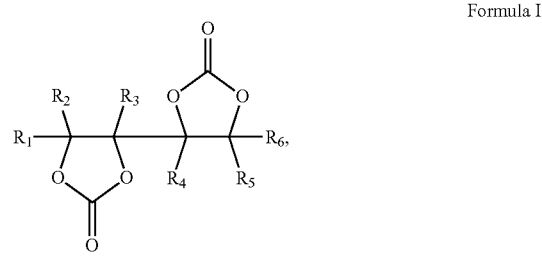

Formula I

In formula I, $R_1$, $R_2$, $R_3$, $R_4$, $R_5$ and $R_6$ are each independently selected from one of hydrogen atom, halogen atom and C1-C5 group.

Preferably, the cyano-containing compound A comprises at least one of the compounds represented by the following formulae II, III, IV and V,

Formula II

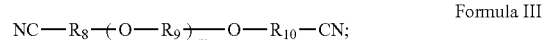

Formula III

Formula IV

Formula V

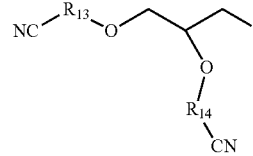

In formula II, $R_7$ is a C1-C8 alkylene, cyano-substituted C1-C8 alkylene, C2-C8 alkenylene, cyano-substituted C2-C8 alkenylene;

In formula III, $R_8$, $R_9$ and $R_{10}$ are each independently selected from a C1-C5 alkylene and C2-C5 alkenylene, and m is an integer of 1-5;

In formula IV, $R_{11}$ is a C2-C5 unsaturated hydrocarbon group, and $R_{12}$ is a C1-C5 alkylene;

In formula V, $R_{13}$, $R_{14}$ and $R_{15}$ are each independently selected from a C1-C5 alkylene and C2-C5 alkenylene.

In the embodiment of the invention, C1-C8 refers to the number of carbon atoms being 1-8, similarly, C2-C8 refers to the number of carbon atoms being 2-8, C1-C5 refers to the number of carbon atoms being 1-5, similarly, C2-C5 refers to the number of carbon atoms being 2-5.

The non-aqueous electrolyte for lithium ion battery provided by the embodiment of the invention comprises at least one cyano-containing compound A represented by formulae II, III, IV and V.

Preferably, the cyano-containing compound A comprises one or more of compounds 10-19 represented by the following structural formulae,

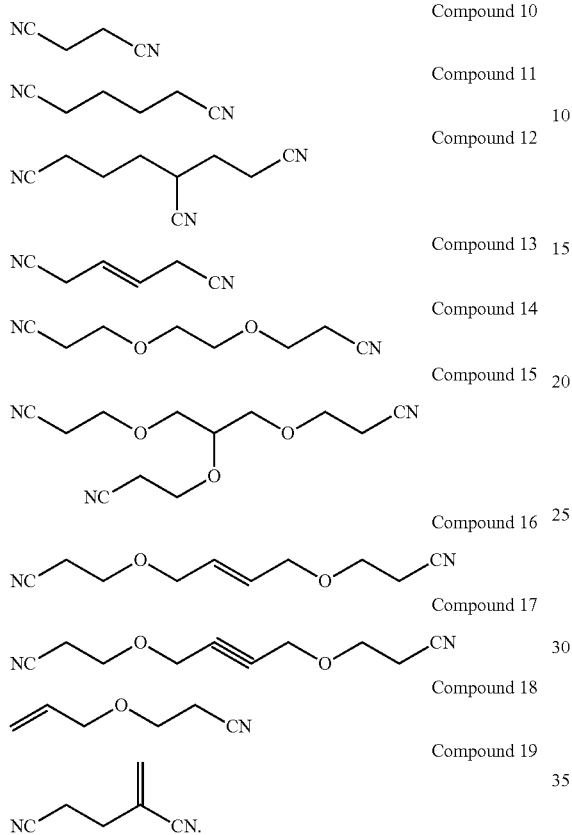

Compound 10
Compound 11
Compound 12
Compound 13
Compound 14
Compound 15
Compound 16
Compound 17
Compound 18
Compound 19

It is further preferred that the percentage mass content of the cyano-containing compound A is 0.1-5% based on the total mass of the non-aqueous electrolyte for lithium ion battery being 100%. It is further preferred that the percentage mass content of the cyano-containing compound A is 0.1-3% based on the total mass of the non-aqueous electrolyte for lithium ion battery being 100%.

It is understood that if the non-aqueous electrolyte for lithium ion battery contains one of the above substances, the content is the content of the one substance; If the non-aqueous electrolyte for lithium ion battery contains a plurality of the above substances, the content is the sum of the contents of the plurality of substances.

The non-aqueous electrolyte for lithium ion battery provided by the embodiments of the invention contains at least one cyano-containing compound A represented by formula II, III, IV and V, the cyano-containing compound A has an obvious positive complexing effect, which can effectively inhibit the structure of the positive electrode material from being damaged, and also inhibits the cartalytic decomposition effect of metal ions on electrolyte and the damage to the negative passivation film. However, the cyano-containing compound A has a negative effect on negative electrode film formation, resulting in deterioration of cycle performance.

In the embodiments of the invention, the compound B represented by formula I was added to the non-aqueous electrolyte of the lithium ion battery on the basis of the cyano-containing compound A. The compound B represented by formula I was added on the basis of at least one cyano-containing compound A represented by formula II, III, IV and V, wherein, the cyano-containing compound A can be complexed with metal ions dissolved from the positive electrode material, which can effectively inhibit the structure of the positive electrode material from being damaged, and also inhibits the cartalytic decomposition effect of metal ions on electrolyte and the damage to the negative passivation film. In the full-charge storage process, the side reaction between the positive electrode material and the electrolyte under high voltage can be effectively reduced, thus improving the storage performance of the lithium ion battery under high voltage. However, the cyano-containing compound A has a deterioration effect on the negative electrode, which easily leads to rapid capacity attenuation of the battery in later period. While the compound B represented by formula I has a good effect of film forming on negative electrode and has little influence on the film impedance, thus improving the stability of the negative electrode in the cycle process and improving the cycle performance. In the non-aqueous electrolyte for lithium ion battery provided by the embodiments of the invention, the compound B was added on the basis of the cyano-containing compound A, the two are used together, so that an effective passivation film can be formed on the negative electrode while complexing protection is assured on the positive electrode of the battery, and side reactions of the electrolyte between the positive electrode and the negative electrode are reduced, so that the cycle performance of the battery can be effectively improved, and meanwhile, the high-temperature storage performance can be enhanced.

Preferably, in formula I, the C1-C5 group includes a C1-C5 hydrocarbon group, halogenated hydrocarbon group, oxygen-containing hydrocarbon group, silicon-containing hydrocarbon group, and cyano-substituted hydrocarbon group.

Preferably, $R_1$, $R_2$, $R_3$, $R_4$, $R_5$ and $R_6$ are each independently selected from a hydrogen atom, fluorine atom, C1-C5 methyl group, C1-C5 ethyl group, C1-C5 methoxyl group, C1-C5 ethyoxyl group, C1-C5 trimethylsiloxy group, C1-C5 cyano group or C1-C5 trifluoromethyl group.

In formula I, preferably, the compound B comprises one or more of compounds 1-9 represented by the following structural formulae,

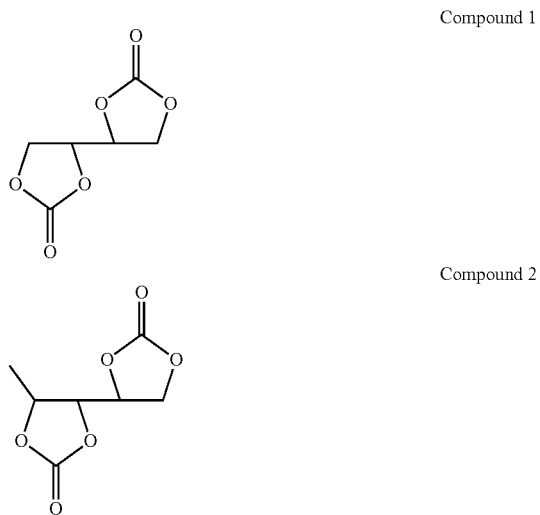

Compound 1
Compound 2

-continued

Compound 3
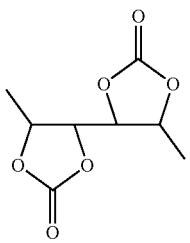

Compound 4
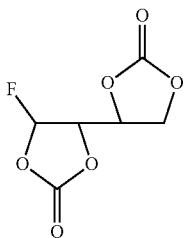

Compound 5
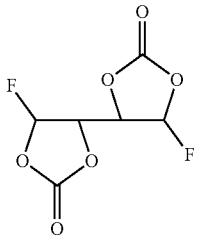

Compound 6
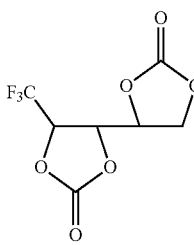

Compound 7
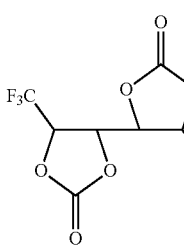

Compound 8
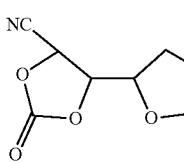

Compound 9
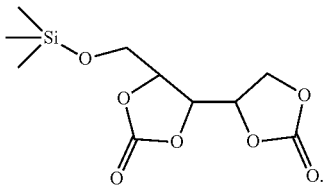

The preferred specific compound above can be better compounded with the cyano-containing compound A to improve the cycle performance and high-temperature storage performance of the lithium ion battery.

The synthesis method of the compound B represented by formula I is conventional, for example, the compound B can be prepared by ester exchange reaction between polyol (such as erythritol, xylitol, etc.) and carbonate (such as dimethyl carbonate, diethyl carbonate, vinyl carbonate, etc.) in the presence of basic catalyst. An example of the synthetic route is as follows:

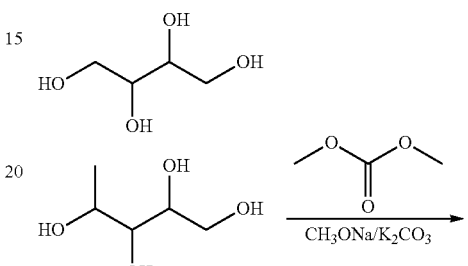

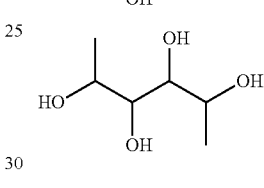

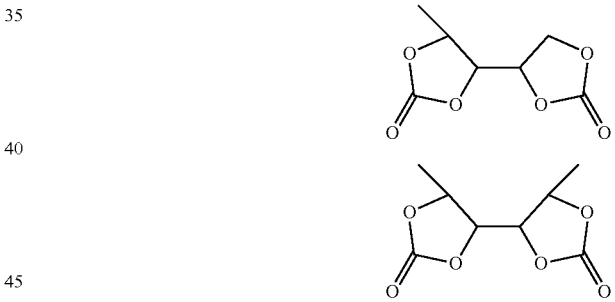

The fluorine-containing compound in compound B is prepared by: fluorinating the corresponding carbonate and mixture $F_2/N_2$, and then recrystallizing or purifying by column chromatography. An example of the synthetic route is as follows:

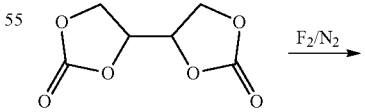

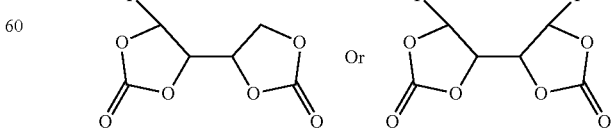

The cyano group-containing compound in compound B is prepared by: the chlorination reaction of the corresponding carbonate and sulfonyl chloride, then reacting with NaCN or KCN, and then recrystallizing or purifying by column chromatography. An example of the synthetic route is as follows:

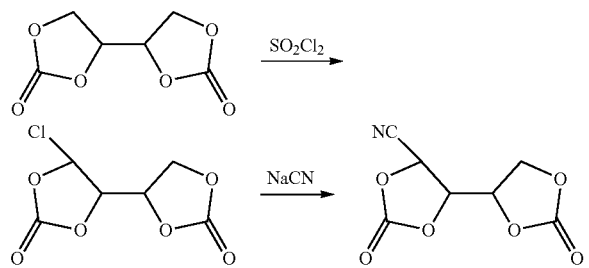

The trimethylsilanolate-containing compound in the compound B is prepared by: the substitution reaction of the corresponding hydroxy carbonate and silazane, then recrystallizing or purifying by column chromatography. An example of the synthetic route is as follows:

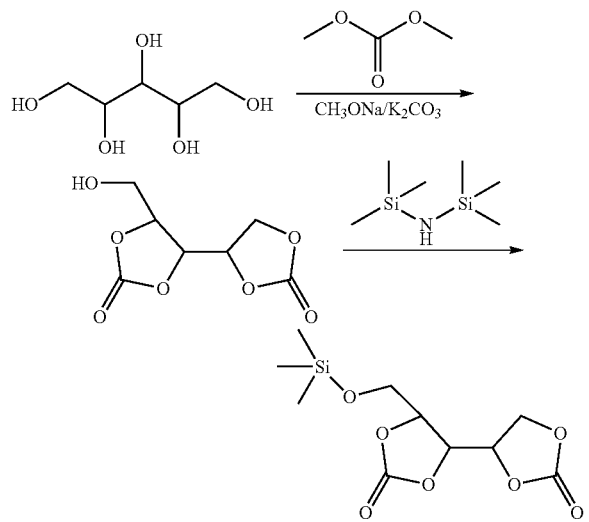

Preferably, the percentage mass content of the compound B is 0.1-5% based on the total mass of the non-aqueous electrolyte for lithium ion battery being 100%. When the content of the compound B is less than 0.1%, it is not conducive to forming a passivation film on the negative electrode, and the improvement effect on the cycle performance of the lithium ion battery is reduced; When the content of the compound B is more than 5%, the film formation on the negative electrode surface of the lithium ion battery is thicker, which will increase the battery impedance. It is further preferred that the percentage mass content of the compound B is 0.1-2% based on the total mass of the non-aqueous electrolyte for lithium ion battery being 100%.

It is understood that if the non-aqueous electrolyte for lithium ion battery contains one of the above substances, the content is the content of the one substance; If the non-aqueous electrolyte for lithium ion battery contains a plurality of the above substances, the content is the sum of the contents of the plurality of substances.

Based on the above embodiments, it is preferred that the lithium ion non-aqueous electrolyte further comprises at least one of unsaturated cyclic carbonate compounds, fluorine-substituted cyclic carbonate compounds, and sultone compounds.

Preferably, the unsaturated cyclic carbonate compound includes at least one of vinylene carbonate (VC) and vinyl ethylene carbonate (VEC). The fluorine-substituted cyclic carbonate compound includes fluoroethylene carbonate (FEC). The sultone compound is selected from at least one of 1,3-propane sultone (1,3-PS), 1,4-butane sultone (1,4-BS), and 1,3-propene sultone (PST).

Apparently, it should be understood that the lithium ion non-aqueous electrolyte may further include at least one of fluorine-substituted cyclic carbonate compounds and/or sultone compounds on the basis of at least one of unsaturated cyclic carbonate compounds.

The content of unsaturated cyclic carbonate compound is 0.1-5% based on the total mass of the non-aqueous electrolyte for lithium ion battery being 100%. The content of fluorine-substituted cyclic carbonate compound is 0.1-30% based on the total mass of the non-aqueous electrolyte for lithium ion battery being 100%. The percentage mass content of sultone compound is 0.1-5% based on the total mass of the non-aqueous electrolyte for lithium ion battery being 100%.

Preferably, the non-aqueous electrolyte for lithium ion battery comprises a non-aqueous organic solvent, and the non-aqueous organic solvent is at least one of vinyl carbonate, propylene carbonate, butylene carbonate, dimethyl carbonate, diethyl carbonate, methyl ethyl carbonate and methyl propyl carbonate. More preferably, the non-aqueous organic solvent is a composition of vinyl carbonate, diethyl carbonate and methyl ethyl carbonate.

Preferably, the lithium salt is selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$. The lithium salt content in the non-aqueous electrolyte for lithium ion battery is 0.1-15%.

As is known to those skilled in the art, the main components in the non-aqueous electrolyte for lithium ion battery are non-aqueous organic solvents, lithium salts and additives. In the present application, compound A and compound B are additives. The content of non-aqueous organic solvent and lithium salt is conventional, and it can be adjusted accordingly after the content of the additive including compound A and compound B is determined, which is not repeated in the present application.

The non-aqueous electrolyte for lithium ion battery provided by the embodiment contains both the cyano-containing compound A and the compound B, which can effectively improve the cycle performance and high-temperature storage performance of the battery at high pressure, so that the lithium ion battery containing the non-aqueous electrolyte has better cycle performance and high-temperature storage performance.

And, the embodiment of the invention also provides a lithium ion battery, comprising a positive electrode, a negative electrode, a separator interposed between the positive electrode and the negative electrode, and an electrolyte, wherein the electrolyte is the non-aqueous electrolyte for lithium ion battery.

Preferably, the positive electrode comprises a positive electrode active material, and the positive electrode active material is at least one of $LiNi_xCo_yMn_zL_{(1-x-y-z)}O_2$, $LiCo_{x'}L_{(1-x')}O_2$, $LiNi_{x''}L'_{y'}Mn_{(2-x''-y')}O_4$, $Li_z$ and $MPO_4$, wherein, L is at least one of Al, Sr, Mg, Ti, Ca, Zr, Zn, Si or Fe, $0 \le x \le 1$, $0 \le y \le 1$, $0 \le z \le 1$, $0 < x+y+z \le 1$, $0 < x' \le 1$, $0.3 \le x'' \le 0.6$, $0.01 \le y' \le 0.2$, L' is at least one of Co, Al, Sr, Mg, Ti, Ca, Zr, Zn, Si and Fe; $0.5 \le z' \le 1$, M is at least one of Fe, Mn and Co.

In the embodiment of the present invention, the negative electrode and the separator are not specifically limited, they can be the conventional ones in the art.

The lithium ion battery provided by the application contains the above-mentioned non-aqueous electrolyte, which enables the lithium ion battery to have both better cycle performance and high-temperature storage performance.

The following description will be made with reference to specific embodiments.

Embodiment 1

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 1, based on the total weight of the non-aqueous electrolyte taken as 100% by weight.

Embodiment 2

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 2, based on the total weight of the non-aqueous electrolyte taken as 100% by weight.

Embodiment 3

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 3, based on the total weight of the non-aqueous electrolyte taken as 100% by weight.

Embodiment 4

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 4, based on the total weight of the non-aqueous electrolyte taken as 100% by weight.

Embodiment 5

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 5, based on the total weight of the non-aqueous electrolyte taken as 100% by weight.

Embodiment 6

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 6, based on the total weight of the non-aqueous electrolyte taken as 100% by weight.

Embodiment 7

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 7, based on the total weight of the non-aqueous electrolyte taken as 100% by weight.

Embodiment 8

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 8, based on the total weight of the non-aqueous electrolyte taken as 100% by weight.

Embodiment 9

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 9, based on the total weight of the non-aqueous electrolyte taken as 100% by weight.

Embodiment 10

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 10, based on the total weight of the non-aqueous electrolyte taken as 100% by weight.

Embodiment 11

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 11, based on the total weight of the non-aqueous electrolyte taken as 100% by weight.

Embodiment 12

A $LiCoO_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 12, based on the total weight of the non-aqueous electrolyte taken as 100% by weight.

Embodiment 13

A LiCoO$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 13, based on the total weight of the non-aqueous electrolyte taken as 100% by weight.

Embodiment 14

A LiCoO$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 14, based on the total weight of the non-aqueous electrolyte taken as 100% by weight.

Embodiment 15

A LiCoO$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 15, based on the total weight of the non-aqueous electrolyte taken as 100% by weight.

Embodiment 16

A LiCoO$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 16, based on the total weight of the non-aqueous electrolyte taken as 100% by weight.

Embodiment 17

A LiCoO$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 17, based on the total weight of the non-aqueous electrolyte taken as 100% by weight.

Embodiment 18

A LiCoO$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Embodiment 18, based on the total weight of the non-aqueous electrolyte taken as 100% by weight.

Comparative Example 1

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 1, based on the total weight of the non-aqueous electrolyte taken as 100% by weight.

Comparative Example 2

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 2, based on the total weight of the non-aqueous electrolyte taken as 100% by weight.

Comparative Example 3

A LiNi$_{0.5}$Co$_{0.2}$Mn$_{0.3}$O$_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 3, based on the total weight of the non-aqueous electrolyte taken as 100% by weight.

The Embodiments 1-18 and the LiNi$_{0.5}$Co$_{0.2}$Mn$_{0.3}$O$_2$/artificial graphite batteries of Comparative Examples 1-3 of the present invention were tested for performance, and the test parameters and test methods are as follows:

(1) High-temperature cycle performance is demonstrated by testing the capacity retention rate after 500th cycles at 1C rate, 45° C. The specific method is as follows: at 45° C., the formed battery was charged with 1C constant current/constant voltage to an operating voltage such as (3~4.4V), the cutoff current was 0.01C, and then discharged to 3.0V with 1C constant current. After such charging/discharging for 500 cycles, the capacity retention after the 500th cycle was calculated to evaluate its high-temperature cycle performance.

The calculation formula of the 500th cycle capacity retention rate at 45° C. 1C is as follows:

The 500th cycle capacity retention rate (%)=(the 500th cycle discharge capacity/the first cycle discharge capacity)*100%;

(2) Room-temperature cycle performance is demonstrated by testing the capacity retention rate after 500th cycles at 1C rate, room temperature. The specific method is as follows: at room temperature, the formed battery was charged with 1C constant current/constant voltage to an operating voltage such as (3~4.4V), the cutoff current was 0.01C, and then discharged to 3.0V with 1C constant current. After such charging/discharging for 500 cycles, the capacity retention after the 500th cycle was calculated to evaluate its room-temperature cycle performance.

The calculation formula of the 500th cycle capacity retention rate at room temperature 1C is as follows:

The 500th cycle capacity retention rate (%)=(the 500th cycle discharge capacity/the first cycle discharge capacity)*100%;

(3) Test method for capacity retention rate, capacity recovery rate and thickness expansion rate after 30 days of storage at 60° C.: the formed battery was charged to an operating voltage at room temperature with 1C constant current/constant voltage, the cutoff current was 0.01C, then discharged to 3.0V with 1C constant current, the initial discharge capacity of the battery was measured, then charged to the operating voltage with 1C constant current/constant voltage, the cutoff current was 0.01C, and the initial thickness of the battery was measured. Then the battery was stored at 60° C. for 30 days, measured the thickness of the battery, discharged it to 3.0V with 1C constant current, measured the capacity retention of the battery, then charged it to the operating voltage with 1C constant current/constant voltage, the cutoff current was 0.01C, then discharged it to 3.0V with 1C constant current, then measured the recovery capacity. The calculation formulas for capacity retention rate and capacity recovery rate are as follows:

Battery capacity retention rate (%)=(retention capacity/initial capacity)*100%;

Battery capacity recovery rate (%)=(recovery capacity/initial capacity)*100%;

Battery thickness expansion rate (%)=(thickness after 30 days−initial thickness)/initial thickness*100%.

The test results of Embodiments 1-18 and Comparative Examples 1-3 are shown in Table 1 below.

As is well known to those skilled in the art, the Embodiments and Comparative Examples in Table 1 above include conventional solvents, lithium salts and other substances in addition to the listed substances, which are not specifically described in the present application, and, in the electrolyte, the weight other than the listed above is the content of solvent and lithium salt.

Referring to the above table 1, Embodiments 1-15 and Comparative Example 1 are compared. The lithium ion non-aqueous electrolyte of Embodiments 1-15 contains both the cyano-containing compound A and compound B, while the lithium ion non-aqueous electrolyte of Comparative Examples 1-3 contains only the cyano-containing compound A. The results show that the lithium ion non-aqueous electrolyte containing the cyano-containing compound A alone has poor high-temperature cycle, room-temperature cycle and high-temperature storage performance. When the cyano-containing compound A and compound B are used together, the cycle performance and high-temperature storage performance of the lithium ion battery can be obviously improved, so that the battery has better cycle performance and high-temperature storage performance. It can be seen that the addition of compound B can significantly improve the cycle performance and high-temperature storage performance of lithium ion batteries.

Comparing Embodiment 16 with Comparative Example 2, Embodiment 17 with Comparative Example 3, Embodiment 18 with Comparative Example 2-3, the lithium ion non-aqueous electrolyte of Embodiments 16-18 and Comparative Examples 2-3 contains the same cyano-containing compound A, the lithium ion non-aqueous electrolyte of Embodiments 16-18 contains the same compound B, in addition, Embodiment 16 further contains 7% FEC, Embodiment 17 further contains 3% PS, Embodiment 18

TABLE 1

| | Compound A | Compound B | Other | The 500th cycle capacity retention rate at 45° C. 1 C (%) | After 30 days of storage at 60° C. Capacity retention rate (%) | Capacity recovery rate (%) | Thickness expansion rate (%) | The 500th cycle capacity retention rate at room temperature (%) |
|---|---|---|---|---|---|---|---|---|
| Embodiment 1 | 0.5% compound 10 | 1% compound 1 | / | 70.28 | 72.18 | 74.55 | 25.67 | 73.28 |
| Embodiment 2 | 1% compound 10 | 1% compound 1 | / | 75.94 | 79.57 | 84.89 | 20.82 | 80.94 |
| Embodiment 3 | 2% compound 10 | 1% compound 1 | / | 83.46 | 87.13 | 88.45 | 13.88 | 84.46 |
| Embodiment 4 | 3% compound 10 | 1% compound 1 | / | 80.4 | 85.55 | 86.51 | 12.3 | 83.4 |
| Embodiment 5 | 2% compound 10 | 0.5% compound 1 | / | 81.31 | 83.25 | 85.68 | 13.09 | 82.31 |
| Embodiment 6 | 2% compound 10 | 1.5% compound 1 | / | 85.46 | 86.19 | 88.08 | 13.54 | 85.46 |
| Embodiment 7 | 2% compound 10 | 2% compound 1 | / | 84.56 | 85.21 | 87.58 | 13.6 | 82.56 |
| Embodiment 8 | 2% compound 10 | 1% compound 3 | / | 84.39 | 86.89 | 88.5 | 11.56 | 84.39 |
| Embodiment 9 | 2% compound 10 | 1% compound 5 | / | 83.67 | 87.81 | 88.61 | 12.44 | 83.67 |
| Embodiment 10 | 2% compound 10 | 1% compound 7 | / | 83.67 | 87.81 | 88.61 | 12.44 | 83.67 |
| Embodiment 11 | 2% compound 10 | 1% compound 8 | / | 84.32 | 87.5 | 89.04 | 12.56 | 84.32 |
| Embodiment 12 | 2% compound 10 | 1% compound 9 | / | 85.5 | 87.52 | 87.96 | 13.52 | 85.1 |
| Embodiment 13 | 1% compound 13 | 1% compound 1 | / | 84.1 | 88.31 | 89.01 | 15.2 | 84.1 |
| Embodiment 14 | 1% compound 14 | 1% compound 1 | / | 84.39 | 86.89 | 88.5 | 11.56 | 84.39 |
| Embodiment 15 | 1% compound 16 | 1% compound 1 | / | 83.67 | 87.81 | 88.61 | 12.44 | 83.67 |
| Embodiment 16 | 2% compound 10 | 1% compound 1 | 7% FEC | 85.37 | 88.89 | 89.69 | 12.44 | 89.65 |
| Embodiment 17 | 2% compound 10 | 1% compound 1 | 3% PS | 86.32 | 88.5 | 89.04 | 12.56 | 88.32 |
| Embodiment 18 | 2% compound 10 | 1% compound 1 | 7% FEC + 3% PS | 86.5 | 89.52 | 90.96 | 13.52 | 92.1 |
| Comparative Example 1 | 2% compound 10 | / | / | 45.6 | 55 | 63.4 | 32.22 | 61.5 |
| Comparative Example 2 | 2% compound 10 | / | 7% FEC | 55.47 | 61.1 | 64.53 | 36.39 | 65.47 |
| Comparative Example 3 | 2% compound 10 | / | 3% PS | 58.59 | 59.63 | 65.31 | 35.66 | 64.59 | further contains 7% FEC and 3% PS, Comparative Example 2 further contains 7% FEC, and Comparative Example 3 further contains 3% PS. The results show that the lithium ion non-aqueous electrolyte containing the cyano-containing compound A and FEC or PS has poor high-temperature cycle, room-temperature cycle and high-temperature storage performance (no obvious improvement compared with Comparative Example 1). However, when the cyano-containing compound A, compound B, FEC and/or PS are used together, the cycle performance and high-temperature storage performance of the lithium ion battery can be obviously improved, and the performance is slightly increased on the basis of not adding FEC and/or PS (Embodiment 3). It can be seen that the addition of compound B can obviously improve the overall performance of lithium ion batteries, including cycle performance and high-temperature storage performance.

The above descriptions are only preferred embodiments and are not intended to limit the present invention. Any modifications, equivalent substitutions and improvements made within the spirit and principles of the present invention shall be included within the scope of protection of the present invention.

What is claimed is:

1. A non-aqueous electrolyte for a lithium ion battery, comprising a cyano-containing compound A and a compound B represented by formula I,

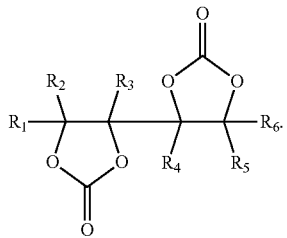

Formula I in formula I, $R_1$, $R_2$, $R_3$, $R_4$, $R_5$ and $R_6$ are each independently selected from one of a hydrogen atom, fluorine atom and C1-C5 group; the C1-C5 group is selected from a C1-C5 hydrocarbon group, halogenated hydrocarbon group, oxygen-containing hydrocarbon group, silicon-containing hydrocarbon group, and cyano-substituted hydrocarbon group; and the percentage mass content of the compound B is 0.1-5% based on the total mass of the non-aqueous electrolyte for a lithium ion battery being 100%.

2. The non-aqueous electrolyte for a lithium ion battery of claim 1, wherein the cyano-containing compound A comprises at least one of the compounds represented by the following formulae II, III, IV and V, NC—$R_7$—CN;  Formula II

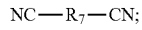

NC—$R_8$—(O—$R_9$)$_m$—O—$R_{10}$—CN;  Formula III

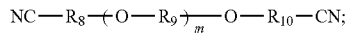

$R_{11}$—O—$R_{12}$—CN;  Formula IV

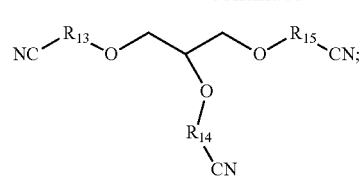

Formula V in formula II, $R_7$ is a C1-C8 alkylene, cyano-substituted C1-C8 alkylene, C2-C8 alkenylene, cyano-substituted C2-C8 alkenylene;

in formula III, $R_8$, $R_9$ and $R_{10}$ are each independently selected from a C1-C5 alkylene and C2-C5 alkenylene, and m is an integer of 1-5;

in formula IV, $R_{11}$ is a C2-C5 unsaturated hydrocarbon group, and $R_{12}$ is a C1-C5 alkylene;

in formula V, $R_{13}$, $R_{14}$ and $R_{15}$ are each independently selected from a C1-C5 alkylene and C2-C5 alkenylene.

3. The non-aqueous electrolyte for a lithium ion battery of claim 1, wherein the compound B comprises one or more of compounds 1-9 represented by the following structural formulae,

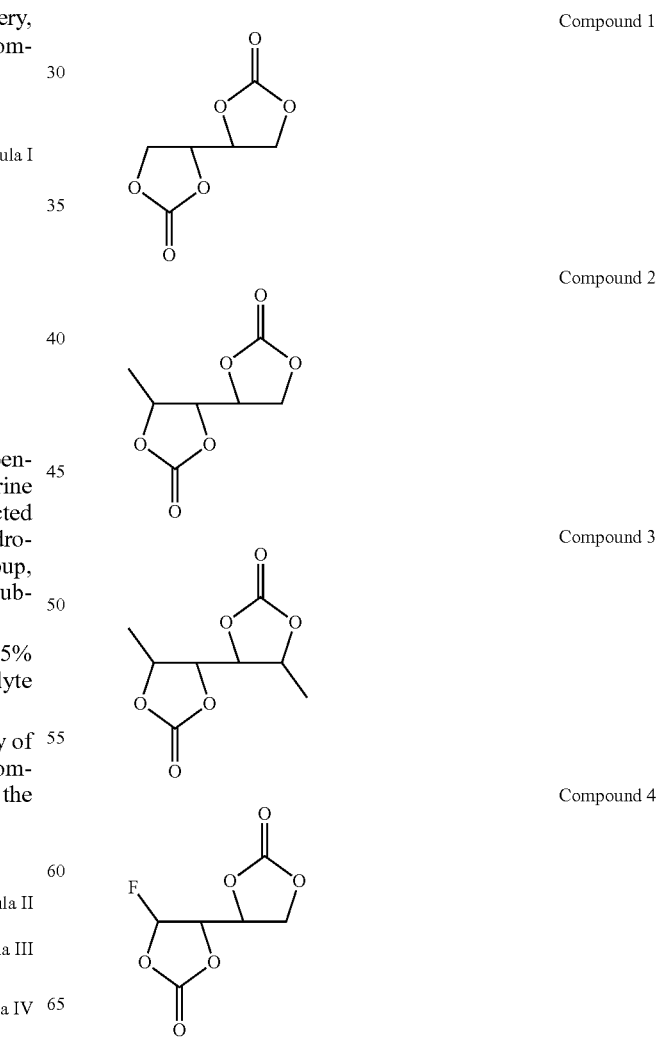

-continued

Compound 5

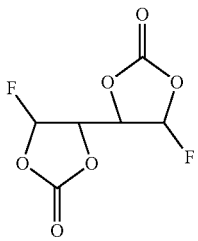

Compound 6

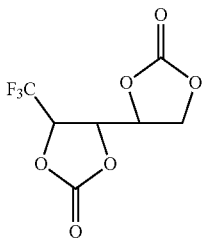

Compound 7

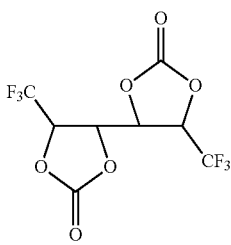

Compound 8

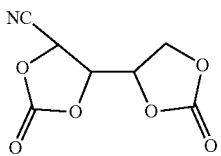

Compound 9

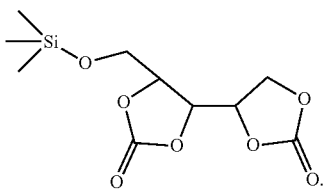

4. The non-aqueous electrolyte for a lithium ion battery of claim 1, wherein the cyano-containing compound A comprises one or more of compounds 10-19 represented by the following structural formulae, Compound 10

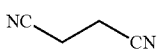

Compound 11

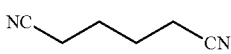

-continued

Compound 12

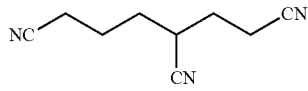

Compound 13

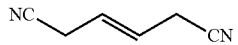

Compound 14

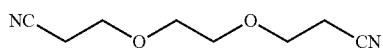

Compound 15

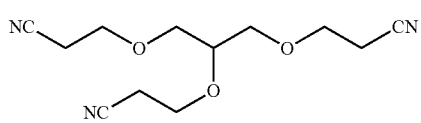

Compound 16

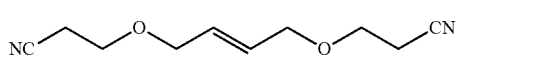

Compound 17

Compound 18

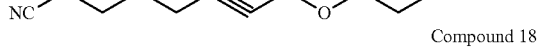

Compound 19

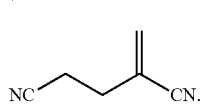

5. The non-aqueous electrolyte for a lithium ion battery of claim 1, wherein the percentage mass content of the cyano-containing compound A is 0.1-5% based on the total mass of the non-aqueous electrolyte for a lithium ion battery being 100%.

6. The non-aqueous electrolyte for a lithium ion battery of claim 1, wherein the non-aqueous electrolyte further comprises at least one of unsaturated cyclic carbonate compounds, fluorine-substituted cyclic carbonate compounds, and sultone compounds.

7. The non-aqueous electrolyte for a lithium ion battery of claim 1, wherein the non-aqueous electrolyte comprises a non-aqueous organic solvent, and the non-aqueous organic solvent is at least one of vinyl carbonate, propylene carbonate, butylene carbonate, dimethyl carbonate, diethyl carbonate, methyl ethyl carbonate and methyl propyl carbonate.

8. A lithium ion battery, comprising a positive electrode, a negative electrode, a separator interposed between the positive electrode and the negative electrode, and an electrolyte, wherein the electrolyte is the non-aqueous electrolyte of claim 1.

9. The lithium ion battery of claim 8, wherein the positive electrode comprises a positive electrode active material, and the positive electrode active material is at least one of $LiNi_xCo_yMn_zL_{(1-x-y-z)}O_2$, $LiCo_xL_{(1-x')}O_2$, $LiNi_{x''}L'_{y'}Mn_{(2-x''-y')}O_4$ and $Li_zMPO_4$, wherein, L is at least one of Al, Sr, Mg, Ti, Ca, Zr, Zn, Si or Fe; $0 \leq x \leq 1$, $0 \leq y \leq 1$, $0 \leq z \leq 1$, $0 < x+y+z \leq 1$, $0 < x' \leq 1$, $0.3 \leq x'' \leq 0.6$, $0.01 \leq y' \leq 0.2$, L' is at least one of Co, Al, Sr, Mg, Ti, Ca, Zr, Zn, Si and Fe; $0.5 \leq z' \leq 1$, M is at least one of Fe, Mn and Co.

\* \* \* \* \*